March 26, 1963  J. G. MOORE ET AL  3,082,541
APPARATUS FOR MAKING PASTE FLAKES
Filed April 20, 1959  3 Sheets-Sheet 1

INVENTORS.
James G. Moore
Edward B. Pinkel
by Popp and Sommer
Attorneys.

March 26, 1963  J. G. MOORE ET AL  3,082,541
APPARATUS FOR MAKING PASTE FLAKES
Filed April 20, 1959  3 Sheets-Sheet 2

INVENTORS.
James G. Moore
Edward B. Pinkel
by Popp and Sommer
Attorneys.

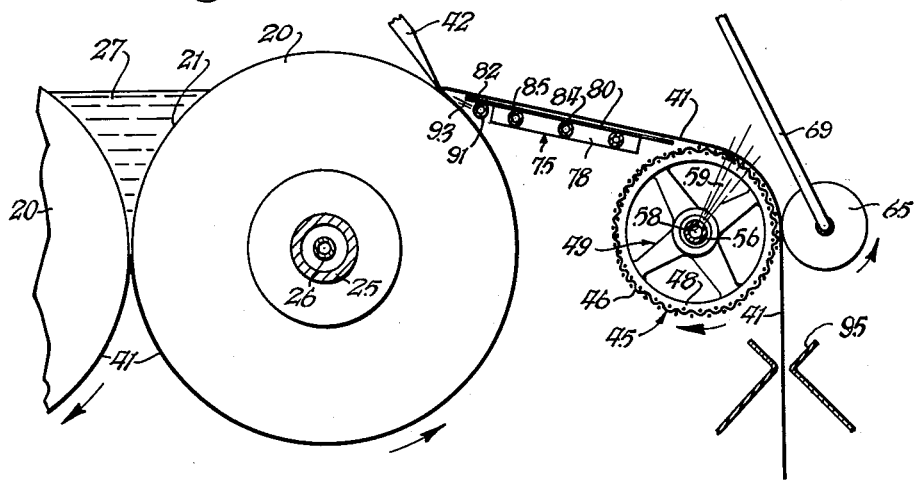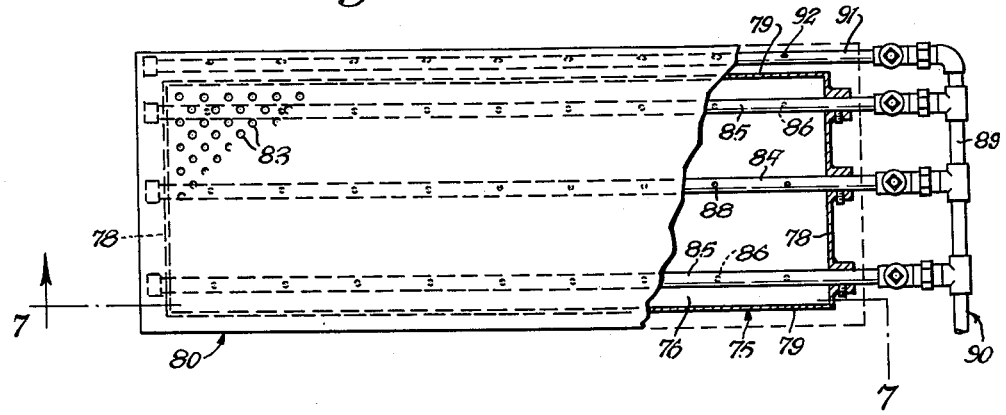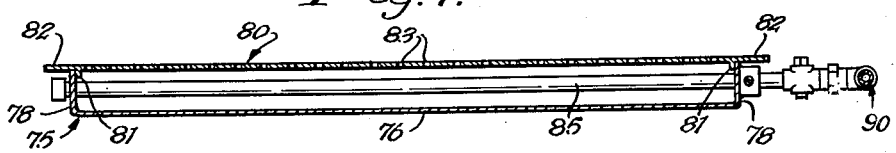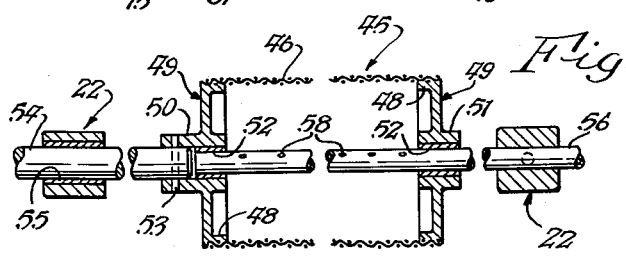

United States Patent Office 3,082,541
Patented Mar. 26, 1963

3,082,541
APPARATUS FOR MAKING PASTE FLAKES
James G. Moore, Williamsville, and Edward B. Pinkel, Buffalo, N.Y., assignors to Blaw-Knox Company, Pittsburgh, Pa., a corporation of Delaware
Filed Apr. 20, 1959, Ser. No. 807,382
7 Claims. (Cl. 34—62)

This invention relates to apparatus for making paste flakes and more particularly to tomato paste flakes which can be very rapidly and easily reconstituted in cold or hot water to produce a tomato paste having the color, taste, aroma, appearance and physical condition of the tomato paste from which the flakes were produced.

The principal object of the invention is to provide apparatus for the economical production of dehydrated tomato paste flakes which can so be reconstituted to produce a tomato paste free from any "grassy" or foreign odors or taste and having the color, taste, aroma, appearance and physical condition of the original and which can be stored for long periods of time so that any required quantity of tomato paste can be kept on hand to be immediately available for use.

In line with this principal object, another object is to provide apparatus for producing tomato paste in the form of solid, non-porous flakes without puffing of the fibers, caramelization of the sugars, destruction of the flavoring esters, denaturization of the protein or degradation of the pectin or other constituents of the original tomato paste.

Another object is to provide apparatus for the production of such flakes from pure tomato paste, that is, from tomato paste containing no additives, but which also lends itself to flakes containing flavoring or preservative additives required by a particular manufacturer, such as sodium chloride, sodium disulfite, paprika, etc.

Another object is to provide apparatus for the production of such tomato paste flakes which is equally applicable to tomatoes from different sections, such as east-coast tomatoes which are more highly acid than west-coast tomatoes.

Another important object is to provide apparatus for the production of such tomato paste flakes which can be very easily rapidly hydrated in either hot or cold water to produce tomato paste ready for use.

Another important object is to provide apparatus for production of such tomato paste flakes having reduced hygroscopicity, that is, is resistant to moisture pick-up, with good keeping qualities and shelf life without degradation or change in flavor, color, aroma or physical condition of the reconstituted tomato paste as compared with the original.

Another object is to provide apparatus for the production of such tomato paste flakes which are and remain dry and free-flowing and are brightly colored to have appetite appeal in the dry form as well as when reconstituted.

Another object is to provide apparatus by which the greater part of the water content is removed under atmospheric conditions on a revolving drum dryer, an important feature, however, residing in the rapid cooling and further drying of the material leaving the atmospheric drying drum, preferably with air which is conditioned as to both temperature and relative humidity to provide the optimum cooling and drying effect.

Another object is to provide apparatus in which the layer or film is cooled during and following its removal from the drum surface to toughen and harden the film so that it can be immediately placed under tension without danger of tearing.

Another important object is to provide apparatus in which the product is removed from the drying drum in such physical condition as to be rapidly cooled and dried. Toward this objective improved traction is provided in stretching the product as it leaves the drum in film form and this stretch of film is supported on a bed of conditioned air jets to support, cool and dry the stretched film leaving the drum surface.

Another object is to provide such apparatus involving the removal of the product in film or layer form under tension and with subsequent cooling and drying in which the film is in large measure self threading through the apparatus and in which proper movement of the material can readily be restored in the event of a tear in the film. This self threading feature is particularly important inasmuch as the apparatus is of the sheet stretching type and threading of the sheet by hand to the stretching or traction cylinder is a serious obstacle to the use of the apparatus.

Another object is to provide apparatus for the production of such high quality tomato paste flakes which operates at high capacity with little supervision in the production of a uniform, high quality product.

Another object is to provide such apparatus in which compensation can be made for insufficient pectin in the paste, pectin being essential to production of thin flakes rather than less freely soluble chips, such pectin loss being present where the so-called "cold break" process is followed and where enzymes responsible for pectin destruction are not destroyed.

Other objects and advantages of the invention will be apparent from the following description and drawings in which:

FIG. 5 is a fragmentary enlarged transverse section taken generally on line 5—5, FIG. 3.

FIG. 6 is a top plan view, with parts broken away, of the means for producing a constantly replenished cushion of drying air and over which cushion the film of tomato paste slides downwardly on leaving the drum surface.

FIG. 7 is a vertical longitudinal section taken generally on line 7—7, FIG. 6.

FIG. 8 is a fragmentary longitudinal section through one of the rotary screen drying and cooling cylinders over which the film of tomato paste passes and which applies tension to the film leaving the drum surface.

Figure 1:
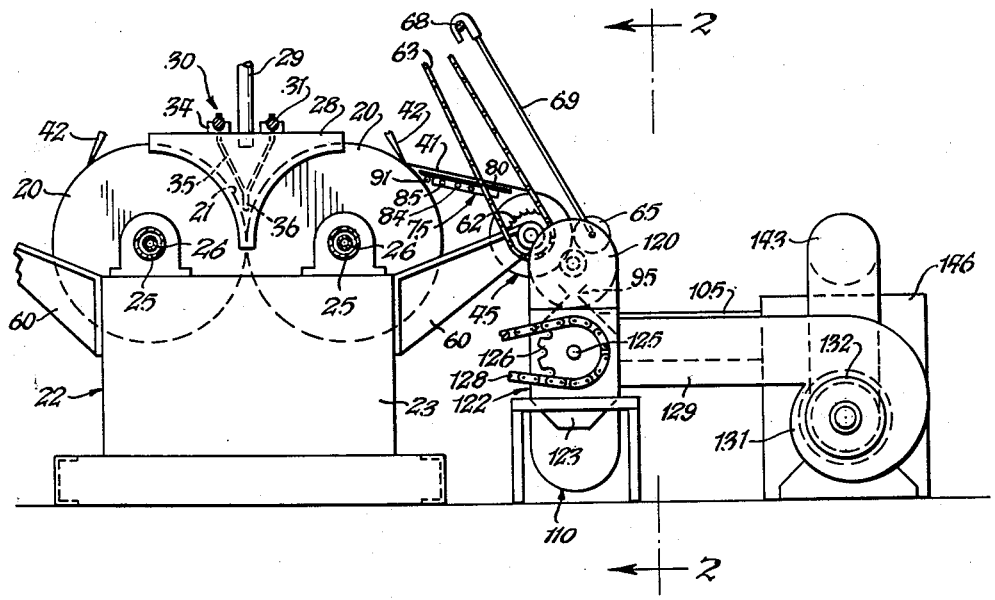
FIG. 1 is a fragmentary end view of a double drum dryer equipped with a mechanism for continuously removing the films or layers of tomato paste from the surfaces of the revolving heated drying drums and embodying the present invention.

The present invention, in part, incorporates apparatus forming the subject of the Harcourt and Lavett Patent 2,352,195 granted June 27, 1944 for Method and Apparatus for Removing Continuous Film of Material From the Surface of Drying Drums. The apparatus of the present invention embodies a number of improvements over this patented apparatus, an important improvement being in the self threading feature of the present invention, it having been found very difficult with the Harcourt and Lavett apparatus, when a tear occurred in the layer leaving the drying drum, to rethread or reapply this torn layer manually to the stretching and cooling traction cylinder, this involving lowering the traction or stretching roll, picking up the torn layer, reapplying it uniformly to the traction or stretching roll, and raising the roll again. Other improvements of the apparatus of the present invention reside in a mechanism for insuring retention of the layer being stretched on the stretching reels, the provision of apparatus whereby the layer can be broken immediately on leaving the stretching traction cylinder, and the provision of apparatus for handling the stretched layer in a conditioned atmosphere.

In common with this patent, the invention is shown in conjunction with a double drum atmospheric dryer although it will be understood that the features of the invention are applicable to any type of revolving drum dryer. The double drum dryer is illustrated in simplified form as comprising two cylindrical drums 20 which have their axes arranged horizontal and parallel with their opposing cylindrical surfaces close together so as to form a downwardly converging space or reservoir 21 therebetween. The main frame of the dryer, indicated generally at 22, includes end standards 23 and 24 at the opposite ends of the drums 20, these drums being provided with horizontal trunnions 25 at each of their ends which are journalled in suitable bearings mounted on the end standards 23 24, of the main frame 22.

Each of the drums is heated and for this purpose the trunnions 25 can be tubular to house a steam pipe 26 by means of which steam is introduced to each of the drums. A body 27 of tomato paste is confined in this reservoir 21 by the usual end boards 28 which are supported by the end standards 23, 24 and are held against the opposite end faces of the pair of drums 20 so as to confine the tomato paste to be dried in this reservoir 21.

The preconcentrated tomato paste is fed into this reservoir 21 between the two drums 20 and is preferably agitated in such manner as to distribute it uniformly lengthwise of the reservoir to insure uniformity in time and temperature treatment the full length of the drying drums. The preferred feeding, distributing and agitating apparatus shown comprises a stationary, open-bottomed, vertical pipe 29 arranged at the center of the reservoir 21 and operating in conjunction with distributing and agitating apparatus indicated generally at 30. This apparatus comprises a pair of parallel, horizontal overhead slide rods 31 arranged above and lengthwise of the reservoir 21 and connected by cross bars 32, 33 at their opposite ends. These rods are guided for longitudinal movement in four slideways 34 provided on the end boards 28 or other stationary part of the dryer. The horizontal slide rods 31 jointly carry a series of depending stirring bars 35. Preferably each of these stirring bars comprises a single length of rod bent into V-shaped form with its upwardly diverging legs extending through and secured to the pairs of horizontal slide rods 31 and with their lower pointed ends 36 arranged in the center of the reservoir 21 close to the pinch, bite or point of closest approach of the drums 20.

A link 38 connects the cross bar 32 of the slide rod 31 with the crank pin 39 of a crank disk 40 suitably journalled on the dryer frame 22. It will be seen that rotation of the crank disk 40 reciprocates the slide rods 31 thereby to move the series of V-shaped stirring bars 35 lengthwise of the reservoir 21. This keeps the tomato paste in this reservoir in agitation and uniform distribution especially near the bite or pinch of the drums from which the material leaves in the form of layers or films adhering to the drums and where the uniformity in condition of the tomato paste in the reservoir is most important.

The drums 20 are rotated in any suitable manner so as to move downwardly at their point of closest approach and thereby carry a film or layer 41 of the tomato paste to be dried along the underside of each of the drums, the thickness of these layers 41 being mainly determined by the clearance spacing of the drums 20 from each other, this spacing being preferably rendered adjustable by any suitable means well known in the art. While this spacing of the drum determines the thickness of the layers, the two emerging layers do not have a thickness of half of this clearance and, in fact the thickness of each layer, on approaching the doctor blade as hereinafter described, is greater than this drum clearance. This is due, of course, to the fact that there is a head of liquid above this clearance in the reservoir 21 and also to changes in the physical state of the material while drying as a layer.

As previously indicated, the drying drums 20 are heated internally as by steam introduced through the steam pipe 26 and hence effect a preconcentration of the tomato paste 27 in the reservoir 21, especially in the bite or pinch of the drums 20 and this heating of the drums also applying heat to the layers 41 adhering to the undersides of the drums on passing the bite or pinch of the drums. These films are carried circumferentially around the drums a sufficient distance to evaporate water from the material to substantially dehydrate the layer following which each of the layers 41 is removed from its drum 20 in accordance with the present invention.

Each film or layer 41 is shown as removed by the usual knife or doctor blade 42 which is shown as arranged at the upper rising quarter of the corresponding drum with its downwardly directed edge in engagement with the periphery of the drum for substantially its entire length so as to continuously remove the film or layer 41 from the upwardly moving peripheral surface of the drum. The knives or doctor blades 42 can be adjustably supported in any suitable manner (not shown).

The layer or film 41 removed by each doctor blade 42 must both be cooled and further dried quickly, and to this end also placed under tension while hot and soft to reduce its thickness and thereby condition it for more effective and rapid cooling and drying. To this end, the film 41 removed from the drum is passed over a foraminous cooling and drying traction cylinder indicated generally at 45, the traction surface of this cylinder preferably being of expanded metal mesh both to provide large openings and hence a large open area through which cooling and drying air from the interior of the cylinder can be directed against the layer of material passing around the cooling and drying cylinder and also to provide the roguhness of angular edges which have been found highly desirable in obtaining the desired tractive effect of the cooling and drying traction cylinder in applying tension to the layer of material being removed from each drying drum 20.

While each foraminous drying and cooling traction cylinder can be of many forms, it is shown as composed of a piece of expanded wire mesh 46 which is wrapped around the rims 48 of a plurality of identical internal supporting wheels or spiders indicated generally at 49. These internal supporting wheels or spiders are arranged at spaced intervals the full length of the drying and cooling traction cylinder 45 and each is shown as having a tubular hub 50 and 51 each containing a sleeve bearing 52. The hub 50 has greater axial length and in the hub is pinned, as indicated at 53, the end of a drive shaft 54 which is shown as journalled in a bearing 55 forming part of the main frame 22 of the apparatus. In the bearings 52 is journalled a stationary air pipe 56 having a plurality of upwardly directed orifices 58 through which jets 59 of conditioned air are directed upwardly through the openings in the expanded metal surface 46 against the underside of the layer 41 of material passing therearound. The air pipe 56 extends outwardly from the hub 51 and its outboard end is shown as nonrotatably supported on the dryer frame 22. It will be seen that the foraminous cylinder 45 is rotatably supported jointly by its drive shaft 54 and the air pipe 56 although this construction can be widely varied.

The bearing 55 for each drive shaft 54 is shown as being in the outer end of a bracket 60 attached to the end standard 23 and the support for the stationary air pipe 56 is shown as being in the form of a bracket 61 projecting outwardly from the end standard 24. A sprocket 62 is shown as being fixed to the outer end of the drive shaft 54 and as driven by a chain 63.

A tractive and stretching effect is impressed by the drying and cooling traction cylinders 45 on the soft film of tomato paste leaving the drum surface. This tractive and stretching effect is achieved by a plurality of rollers 65 which bear against the exterior side of the layer 41 of tomato paste draped over and leaving the downwardly descending side of each cooling and drying traction cylinder 45. To support these traction rollers 65, end posts 66 are provided on the brackets 60 and 61 and these end posts support fixed overhead rods 68 which are arranged parallel with the axes of the drying drums 20 and foraminous cooling and traction drums 45. Each roller 65 is journalled on the lower end of a corresponding swinging rod 69 to rotate about an axis parallel with the axis of its foraminous drying and cooling traction cylinder 45 and the upper end of each swinging rod 69 has a hub 70 which is both slidably and rotatably supported on the corresponding overhead rod 68. The swinging rods 69 can therefore be moved lengthwise of the drying and cooling traction cylinders 45 to obtain any desired concentration of tractive effect of the rolls 65 on the layer of material 41 draped over these cylinders and the angularity of the swinging rods 69 is such the weight of these rods and their rollers 65 is translated into a horizontal force against the descending vertical side of the sheet of material 41 leaving each foraminous cooling and drying traction cylinder 45. By applying the pressure of the rolls 65 at this point the entire engaged surface of each foraminous drying and cooling traction cylinder is made more effective as a traction surface. Also by having a plurality of rolls 65 which are individually capable of being manually removed from the surface against which they rest, the threading of the layer 41, especially when broken, is facilitated. Thus if this layer 41 of material being processed is broken along a jagged line, one after the other of the rolls 65 can be lifted away to permit the layer to be draped over the entire surface of the corresponding foraminous cooling and drying traction cylinder without interference from the rolls 65.

In addition to being dried and cooled while passing around each cooling and drying traction cylinder 45, each film or layer 41 is dried and cooled both while being removed from its drying drum 20 and also while traveling from the drying drum to its cooling and drying traction cylinder 45, this cooling and drying being in the form of upwardly directed jets of dehumidified and preferably cooled air which form an inclined air cushion or slide on which the film or layer 41 moves downwardly from the doctor blade 42 to the cooling and drying traction cylinder 45. This cooling, drying and supporting of the film leaving each drying drum 20 is preferably constructed as follows:

The numeral 75 represents a rectangular pan having a bottom 76 and low upright marginal end and side walls 78 and 79. This pan is provided with a removable top plate or cover 80 having locating ribs 81 fitting inside the walls 78 and 79 as best shown in FIG. 7 and having marginal portions 82 projecting beyond these walls. This top plate or cover 80 is provided with a multiplicity of evenly spaced holes or openings 83. From the interior of the pan 75 a plurality of air pipes 84 and 85 extend through the end walls 78, and within the pan 75, the air pipes 85 have downwardly directed air discharge orifices 86 while the air pipes 84 have upwardly directed orifices 88. These air pipes are parallel and the orifices 86 and 88 are spaced at regular intervals so as to provide a uniform supply of dehydrated and preferably cooled air to all parts of the pan 75, thereby to provide a uniform discharge of drying and cooling air upwardly from all of the holes or openings 83 in the top plate 80 and to provide an air bed or cushion over which each sheet 41 floats and slides downwardly as it travels from its doctor blade 42 to its drying and cooling cylinder 45. For this purpose each pan 75 is mounted in any suitable manner (not shown) on the dryer frame 22 so that its upper longitudinal edge is arranged, as shown in FIG. 5, below the edge of the corresponding doctor blade 42 and close to the drum surface and inclines downwardly with its lower longitudinal edge arranged close to the periphery of the corresponding cooling and drying cylinder 45 at its rising side and near its highest point.

The air pipes 84, 85 have their ends connected to a header 89 which, as best shown in FIG. 6, is arranged externally along one end of the pan 75. This header is supplied with cooled dehydrated air from a supply line 90.

Each header also supplies cooled dehydrated air to an air pipe 91 which is arranged externally of the pan 75 alongside its upper side wall 79 and under the portion 82 of the top plate or cover 80 which projects above the pan and toward the edge of the doctor blade 42. Each air pipe 91 is provided along one side with a line of air discharge orifices 92 which direct streams 93 of conditioned air toward the edge of the doctor blade 42 and hence against the underside of the layer of material 41 leaving the drum surface. Accordingly it will be seen that the layer 41 of material leaving each drum surface is immediately subjected to cooling and drying by the air stream 93 from the air pipe 91 and is then further cooled and dried by the supporting blanket or bed of air streams issuing from the holes 83 in the top plate or cover 80 for this pan 75, and is then further cooled and dried on passing around the descending side of the foraminous cooling and drying traction cylinder 45 by the air streams 59 issuing from the air pipe 56 therein.

This film 41 of material descending from the descending side of each foraminous cooling and drying traction cylinder 45 enters a trough-like inlet mouth 95 which is of V-shaped form in cross section and is provided at the apex of the top wall 96 of a breaker box 98 which extends substantially the full length of its cooling and drying cylinder 45. In the end heads of this breaker box is journalled a shaft 99 carrying, within the breaker box 98, a series of radially projecting breaker bars or arms 100 which strike the layer 41 descending into the breaker box to break it into small pieces. The breaker bar shaft 99 is shown as having a pulley 101 driven by a belt 102 and one longitudinal side wall of the breaker box is open, as indicated at 103, and provided with a vertical screen 104 to prevent the escape of materials and this open side communicates with a return air duct 105 having a damper 106 for a purpose which will presently appear. A series of vertical bars 108 in the breaker box 98 serve to confine the material in process to the breaker bars 100 so as to be acted thereon.

The bottom of the breaker box 98 is open and discharges the broken film through the otherwise closed top 109 of the trough of the conveyer 110 having a semicylindrical bottom 111. One end of this conveyer is enclosed by an end head 112 in which the conveyer shaft 113 is journalled as indicated at 114. This end of the shaft has a sprocket 115 fixed thereto and driven by a chain 116 and the other end of this shaft is suitably journalled, as indicated at 118, so that the broken material can be discharged from this end of the conveyer trough. This is done by a screw conveyer fast to the conveyer shaft 113, this preferably being in the form of a helical ribbon 119.

From the discharge end of the trough of the conveyer 110 the materials are discharged through an elbow duct 120 into the casing 121 of a flaker indicated generally at 122, this casing having a hopper bottom 123. The flaker is shown as having a vaned rotor 124 on a horizontal flaker shaft 125 which is shown as being suitably journalled in two opposite side walls of the flaker casing and driven by a sprocket 126 and chain 128.

Another vertical wall of this flaker casing 121 is provided with a cooling and drying air inlet communicating with a duct 129 having a damper 130 and leading to the discharge of a blower 131 driven by an electric motor 132. The inlet 133 of this blower is shown as connecting with the outlet 134 of the casing 135 of a heater 136 which can be supplied with heat from any suitable source, as indicated by the inlet and outlet pipes 138 and 139, to reheat the air passing therethrough. This air is derived from air dehumidifying apparatus, indicated generally at 140. This dehumidifying apparatus can be of any form to remove moisture from a stream of air, such as with liquid or solid hygroscopic material, but for the present purpose the use of cooling coils to lower the temperature of the air stream below its dewpoint to condense moisture from the air has been found satisfactory. Preferably separate dehumidifiers 141 and 142 are provided each in one of two branches of a duct 143 leading to the heater 136 which, with the use of cooling coils to remove the moisture, serves as a reheater. One or both of the dehumidifiers 141, 142 can be put in service and the temperature of the cooling coils can be regulated to obtain the required moisture removal from the air to be used for drying and cooling the film. Where a solid hygroscopic substance is used, one dehumidifier 141 or 142 can be placed in service while the other is being reactivated.

The duct 143 connects with the outlet 145 of a dust collector 146, the inlet 148 of which connects with the duct 105 leading from the screened side opening 103 of the breaker box 98.

For accurate regulation of the relative humidity of the air leaving the reheater 136, the usual by-pass or recirculation duct 149 can be provided between the outlet of the blower 131 and the duct 143 to the dehumidifying apparatus 140 and the amount of air returned can be regulated automatically or manually by a damper 150.

The invention is used in the production of tomato paste in flaked form and which can be produced from tomatoes having high acidity, such as those grown in the eastern part of the United States which are highly acid as compared with those grown in the western part. The flakes, upon being hydrated, must be immediately available for use and are usually made from pure tomato paste, that is, containing no additives. However, if desired the tomato paste from which the flakes are made may contain additives such as sodium disulfite, emulsions of resin gum and condiments such as salt, pepper, paprika and the like. Desirably the feed material is in paste form and to this end is preconcentrated, to a concentration of from about 65 to about 85% moisture content. The tomato paste contains sugars subject to carmalization, on sustained overheating, fibers subject to puffing, flavoring esters subject to destruction or degradation and which are subject to alteration to produce "grassy" or other foreign odors or flavors, and protein subject to denaturization.

An important constituent of tomato paste for dehydration and flaking on the apparatus of the present invention is pectin and it is desirable that the tomato paste have a normal pectin content to behave satisfactorily during drying in order to produce extremely thin flakes having a reduced tendency to pick up moisture from the air but which hydrate with extreme rapidity in cold or hot water in reconstituting the flakes in the form of a high quality tomato paste having the same aroma, flavor and physical characteristics as the original tomato paste. With insufficient pectin content, with the practice of the present invention, the product tends to be in the form of chips, rather than in the form of thin flakes or plates and which dissolve less readily in water, and while such chips can be reconstituted to provide a satisfactory tomator paste, they lack the rapid solubility which is particularly characteristic of the present invention. However it will be seen that the presence of adequate pectin is a highly desirable but not absolutely essential factor in producing flakes on apparatus of the invention. Pectin is normally in tomato paste as a part of the tomato pulp from which the paste is made, usually in the order of 0.13% of the raw bulk of the tomato pulp or 0.5% in a 25% paste. The sugar and fiber content, but particularly the pectin content, provide the high film strength highly desirable, particularly at the point where each soft and incompletely solidified film or layer 41 is removed from the drum surface by the doctor blade 42 where immediate tension must be imposed to reduce the thickness of the film gathered in puckered form by the doctor blade. At this point the tomato paste is at its maximum temperature and hence at its minimum tensile strength, the tensile strength of the tomato paste film varying inversely with its temperature.

A typical composition of tomato paste suitable for flaking can be as follows, the percentages being based on a tomato paste at a concentration of 25% solids:

| | Percent |
|---|---|
| Reducing sugars: | |
|     Dextrose | 8.53 |
|     Levulose | 7.56 |
| Sucrose | 0.42 |
| Protein | 4.62 |
| Starch | 0.21 |
| Pectin and protopectin | 0.55 |
| Insoluble solids | 3.11 |
| Total solids | 25.00 |

As previously indicated, the concentration of the feed material can be from about 65 to 85% water and is preferably fed to the reservoir 21 between the atmospheric drying drums 20 at a temperature between about 95° to 125° F. although the feed temperature is not particularly critical and the feed temperature can be as high as 205° F. The feed is down the feed pipe 29 into the body 27 of tomato paste contained within the reservoir 21 between the drums 20.

In this reservoir 21 the incoming feed is rapidly brought up to the bath temperature and for this purpose the level of the material in the reservoir is preferably kept low, this material being preferably kept in agitation and uniform mixture not only by the downwardly moving drum surfaces, but also by the V-shaped agitator or stirring bars 35 which are reciprocated along the bite or pinch of the drums 20 by the overhead sliding bars 31 from which they are suspended and which are reciprocated horizontally by the crank pin 39 on the crank disk 40.

The steam pressure in the drying drums 20 is maintained at from about 70 to 90 pounds gage, that is, from about 300°–320° F. although lower steam pressures can be used with slower drum speeds and at these steam temperatures the liquid tomato paste is brought up to its boiling temperature of about 214° F. to 220° F. or higher in the reservoir.

The two drying drums 20 are preferably spaced apart from about .004 to about .015 inch and as the drum surfaces move downwardly at their bite or point of closest approach, each drum picks up a layer 41 of liquid material on the part of its periphery emerging downwardly from the reservoir 21, the thickness of which is determined by the above clearance between the drums. These layers travel around the descending lower quarters and the ascending sides of the drums 20 and being in contact with the hot drum surfaces in thin layers are rapidly evaporated. The detention time of the films 41 on the drums 20 is from about 4 to 15 seconds. By the time each doctor blade 42 is reached, each film 41 is heated to a temperature from about 260° F. to about 270° F. and has a concentration of from about 2% to about 5% moisture and at this point is in the form of a soft somewhat gummy incompletely solidified film or layer which tends to gather or pucker into thick form as it rides up on the edge of the doctor blade 42.

This tendency to gather is inhibited by tension impressed on the sheet 41 being stripped from the drum surface by the doctor blade 42. This tension not only effects clean peeling from the drum without substantial accumulation at the doctor blade but also restores the film thickness to substantially the thickness of the film on the drum as it approaches the doctor blade, this thickness being from about .005 to .030 inch, this being the final flake thickness. It is desirable to reduce the thickness of the gathered or puckered film as much as possible without tearing the film or layer at its weakest point which is at the knife edge of the doctor blade 42. As previously indicated, the composition of the film or layer is important in this regard, particularly in having a substantial pectin content although the fiber and sugar content also contribute to the film strength required to resist the tension imposed on the sheet or film leaving each doctor blade.

With reference to the pectin content, even when present in sufficient amount in the raw tomatoes, it can be reduced below a desirable level by subsequent processing into the paste to be flaked. Thus with the so-called "cold break" process where heat is not applied, the enzymes which are inimical to pectin are not destroyed and hence attack the pectin and reduce its content. With the so-called "hot break" process, the enzymes inimical to pectin are destroyed, reduced or inactivated so that the processed paste has a higher pectin content. Accordingly the use of the apparatus of the invention comprehends adding pectin to tomato paste having a too low pectin level, regardless of whether such low level is due to an initial lack of pectin or to subsequent processing.

The tension so applied is the maximum, with a suitable factor of safety, which can be applied short of tearing the layers or films 41 at the doctor blades 42 and is impressed by the foraminous cooling and drying traction cylinders 45. The crests of these cooling and drying traction cylinders are preferably arranged below the level of the edges of the doctor blades 42 so that the stretch of film under tension travels downhill, and to provide the traction required, the traction surfaces 46 of these cooling and drying traction cylinders are preferably made of expanded metal to present sharp or angular edges to the films draped thereover. These cooling and drying traction cylinders are power driven in the direction and at a speed to produce tension in the stretches of film 41 between them and/or the doctor blades, but the peripheral speed of these cooling and drying traction cylinders 45 generally does not exceed the peripheral speed of the heated drums 20 because the stretching or attenuation of each film 41 is essentially performed after or while the film is building or puckering up to increased thickness on the doctor blade 42 rather than stretching or attenuation to a thinness less than the thickness of the film immediately approaching the doctor blade.

The tension impressed to so restore the thickness of the film must, however, be close to the maximum, short of tearing, which the film 41 leaving the doctor blade 42 will stand and greater traction of the cooling and drying traction cylinders is required beyond that provided by merely draping the film over the sharp edged surface of the expanded metal screening 46 of these cylinders. This increased traction is provided by the rolls 65 which bear against the sides of the foraminous cooling and drying traction cylinders at the 3:00 o'clock position thereof as viewed in FIG. 5. By so positioning the rollers 65 at this position, the effect of these rollers is effective over the entire area of contact of the film 41 with each foraminous cooling and drying traction cylinder 45, that is, the entire upper descending quarter of the latter. This would not be the case if these rolls 65 were arranged higher. It will also be seen that any of these rolls can easily be swung away individually from contact with the film 41 or the foraminous cooling and drying traction cylinder 45. This feature is important in draping a jagged film over the traction cylinders under these rolls.

During its progress from the doctor blade 42 to its contact with the rolls 65, the film or layer 41 is subjected to cooling and further drying with conditioned air, as hereinafter described, this conditioned air also being used to prevent any moisture pick-up during flaking and to stabilize the flakes against such moisture pick-up in storage. To this end the breaking up and flaking of the film 41 is effected in an enclosed space containing a controlled atmosphere the inlet humidity of which, at the air inlet and product outlet, is substantially in equilibrium with the leaving product and the temperature being below the temperature of the product so as to further the cooling thereof.

To this end each sheet of film or layer 41 is dropped from the descending side of its cooling and drying or friction cylinder 45 into the mouth 95 of a breaker box 96 in which it is broken up by the rotating breaker bars 100 in a controlled atmosphere leaving the breaker box through the screen 104 for recirculation through the dust collector 146, dehumidifying apparatus 140 and heater 136 to the inlet of the main blower 131.

Figure 2:
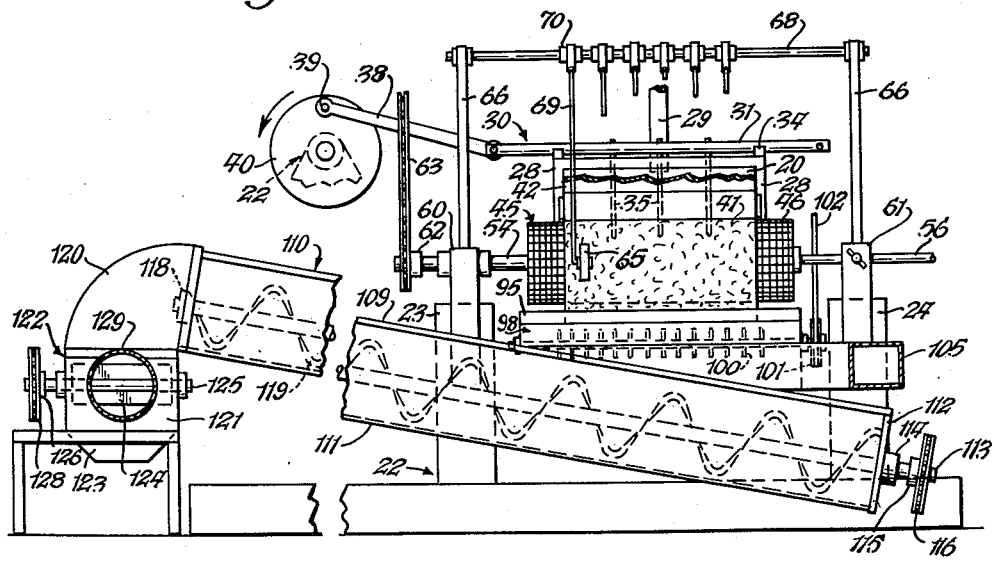
FIG. 2 is a fragmentary side elevational view thereof, taken generally on line 2—2, FIG. 1.
Figure 3:
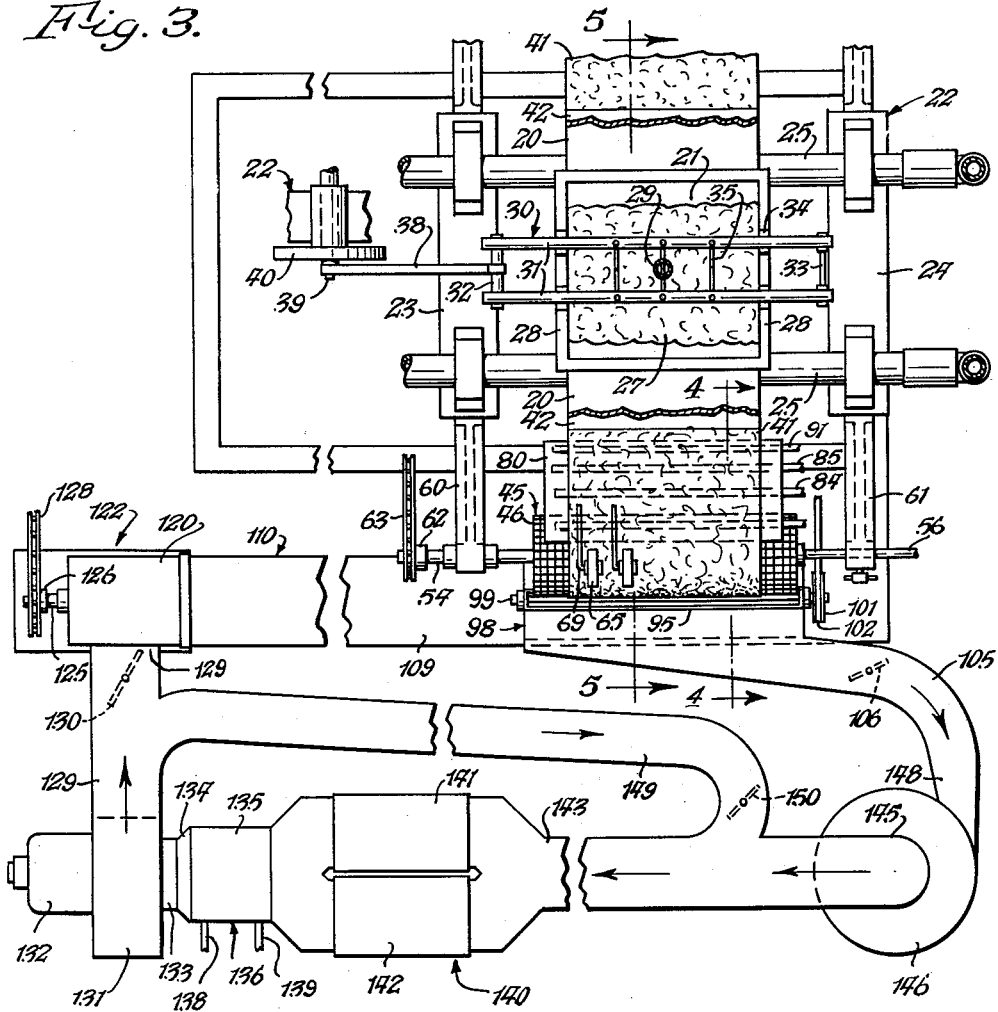
FIG. 3 is a fragmentary top plan view thereof.
Figure 4:
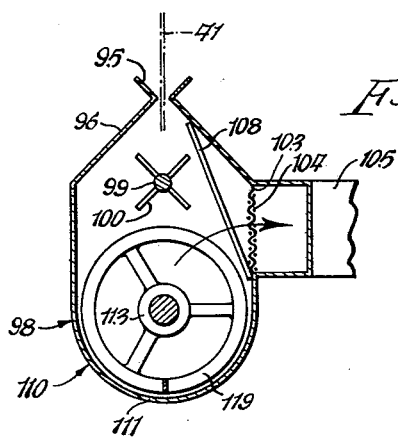
FIG. 4 is a fragmentary enlarged vertical transverse section taken generally on line 4—4, FIG. 3.

This controlled air comes in through the open bottom of the breaker box from the enclosed conveyer housing 109, 111 along which the broken product is conveyed by the helical ribbon conveyor 119 to the left hand end of the housing as viewed in FIG. 2 where it is dropped into the flaker 122 in which, still in a controlled atmosphere, it is reduced to flake form and leaves through the hopper bottom 123. This controlled atmosphere is supplied from the blower 131 through the side inlet 129 of the flaker 122 and thence passes the length of the conveyer housing 109, 111 and thence upwardly through the breaker box 98 to provide the controlled atmosphere in the latter. At the inlet 129 to the flaker 122 the humidity of the entering air is preferably in equilibrium with the leaving product, preferably having a relative humidity of from about 37 to about 42% with a dry bulb temperature of from about 48 to about 60° F. and an absolute humidity of from about 19 to about 31 grains per pound of air. During the progress of the material through the breaker box 98, conveyer 110 and flaker 122, the temperature of the product is reduced a few degrees and a small amount of drying of the material, usually not exceeding 1% on a dry basis, can take place but it is desirable to have the humidity of the entering air substantially in equilibrium with the leaving product, it having been found that this not only prevents pick up of moisture during this processing but also stabilizes the product against subsequent pick up in storage provided that the final moisture content of the product is less than 3% water and preferably closer to 2%.

The product is preferably stored in sealed containers until ready for use.

It is desirable to reuse the conditioned air so utilized to stabilize the product while being broken up, conveyed and flaked in the breaker box 90, conveyer 110 and flaker 122, respectively. To this end the used air leaving the screened opening 103 in the side wall of the breaker box 98 is conducted by the duct 105 through the dust collector 146 through one or both branches 141 or 142 of the dehumidifier where moisture is removed from the air. After having its moisture content reduced, the air passes through the heater 136 where it is reheated if required and thence to the inlet of the main blower 131 which returns it at proper temperature and relative humidity to the flaker 122 for stabilization of the material while being processed in the breaker box 98, conveyer 110 and flaker 122 as previously described. Reheating may not be necessary.

A part of the conditioned air from the blower 131 is used to cool and dry the layer of tomato paste from its removal from the drum surface until it is dropped into the breaker box 98.

Thus a part of this conditioned air is supplied from the pipe 91 under the doctor blade 42 in the form of a series of jets 93 directed against the film or layer 41 being stripped from the surface of each heated drum 20 by its doctor blade 42. This stream is against the side of the film opposite its drumside and is important in hardening the film under tension at its weakest point namely at the edge of the doctor blade 42. At this point and during its travel to its cooling and drying or traction cylinder 45 the film is under tension and to support the film while being attenuated from its gathered form at the edge of the doctor blade 42, as well as to toughen and cool the same, the film passes downwardly on a bed of conditioned air. This bed is in the form of a multiplicity of jets issuing upwardly from the holes 83 in the top plate 80 of the pan 75 which is supplied, with uniform distribution, with conditioned air from holes 86, 88 along the pipes 84 and 85 therein. These upward jets from the holes 83 form a cushion over which the layer or film 41 slides downwardly while subjected to tension as previously described.

As the layer or film 41 passes around the foraminous cooling and drying drum it is subjected to further cooling, drying and hardening by the conditioned air from the blower 131. This issues as the jets 59, FIG. 5, from the air pipe 56 in each cooling and drying drum, this pipe being stationary and the jets, as shown in FIG. 5, being directed upwardly against the underside of the film or layer 41 draped over each cooling and drying or traction cylinder.

Examples of drying tomato paste from tomatoes from the eastern part of the United States and which are more highly acid are as follows. The temperatures are in degrees Fahrenheit.

placement of the relatively non-hygroscopic sucrose to the outside of the flake during the above processing.

The flakes produced in all of the examples were readily reconstituted into tomato paste in either hot or cold water, it being immaterial in such reconstituting whether the flakes were mixed into the water or the water mixed into the flakes. In either case one minute with moderate hand stirring served to complete the restoration, the individual flakes disappearing and forming a creamy paste substantially identical in color, flavor, aroma, appearance and cooking qualities with the original paste from which the flakes were made.

Hunter color tests were made on the reconstituted paste and the alpha to beta ratio was found to be from 2.17 to 2.21 as compared to a standard of 2.32 for 25% tomato paste. Since with Hunter the higher the alpha-beta ratio the greater the red and the lower this ratio the more the yellow, it will be seen that the practice of the invention results in a reconstituted tomato paste of more orange color than the original although the reconstituted product is bright red, the appearance of orange not being reached until the ratio lowers to 1.5.

The dry tomato paste flakes of the present invention have a thickness less than about .022 inch, preferably of from about .005 to about .030 inch with a moisture content not exceeding 3%, preferably from 1.5 to 2.65. They are characterized by being resistive to moisture pickup

| Example No. | A | B | C | D | E | F | G | H | T | J |
|---|---|---|---|---|---|---|---|---|---|---|
| Material fed, percent moisture | 73 | 73 | 73 | 73 | 73 | 73 | 84.7 | 83.9 | 81.3 | 81.6 |
| Material fed, temperature | 103 | 100 | 92 | 97 | 98 | 94 | 118 | 121 | 120 | 109 |
| Steam press. in drums, p.s.i.g. | 80 | 79 | 78 | 78 | 78 | 78 | 85 | 88 | 87–90 | 85 |
| Final product, percent moisture | 1.7–2 | 2.0 | 1.5 | 2.4 | 2.1 | 2.0 | 2–2.3 | 2 | 2.1 | 2–2.5 |
| Sheet thickness, inches | .020 | .015 | .018 | .022 | .011 | .010 | .013–5 | .012–5 | .015–7 | .017–9 |
| Drum clearance, inches | .006 | .006 | .009 | .009 | .010 | .010 | .004 | .004 | | |
| Sheet temp. into breakerbox 98 | | | | 120 | 130 | 130 | | | | |
| Air temp. into flaker 122 | 43 | 56 | | | 52.5 | 55 | 56 | 58 | 56 | 55 |
| Product temp. in conveyer 110 | | 63 | | | 62 | 65 | 60 | 63 | 64 | 63 |
| Relative Humidity air supply, percent | 37 | 42 | 42 | 42 | 50 | 41 | 38 | 39 | 41 | 40 |
| Absolute Humidity air supply, gms./lb., air | 19 | 30 | 30 | 30 | 30 | 30 | 22 | 29 | 31 | 26 |

Examples of the practice of the invention in drying tomato paste from tomatoes from the western part of the United States and which are less acid, and also tomato paste containing additives, are as follows. Example K is of pure paste from west coast tomatoes, that is, containing no additives, Example L of tomato paste with sodium disulfite, and Example M of tomato paste containing an emulsion of resin gums and paprika. The temperatures are in degrees Fahrenheit.

| Example No. | K | L | M |
|---|---|---|---|
| Material fed, percent moisture | 67 | 81.4 | 81.2 |
| Material fed, Temperature | 110 | 120 | 120 |
| Steam press in drums, p.s.i.g. | 80 | 82 | 85 |
| Final product, percent moisture | 1.5–2.2 | 2.65 | 1.9–2.5 |
| Sheet thickness, inches | .015 | .017–9 | .017–9 |
| Drum clearance, inches | .006–8 | | |
| Air temp. into flaker 122 | 60.5 | 43 | 54 |
| Product temp. in conveyer 110 | 63.5 | 55 | 59 |
| Relative Humidity air supply, percent | 45.5 | 41 | 44 |
| Absolute Humidity air supply, grams/lb. air | 30 | 24 | 26 |

In all of the above examples no puffing of the fibers occurred during the process and the hot material stripped from the heated drum surface in Examples A through M was stretched into a thin non-porous sheet which was flexible and almost gelatinous when partly cooled but was very friable when completely cooled to yield thin, dense, plate-like particles or flakes as the final product of the flaking step which flakes were found to be relatively non-hygroscopic on exposure to the atmosphere and of a bright red color. This freedom from moisture pick up may be in part due to its flake form in which it has less exposed area per unit weight as compared with powder and may also be in part due to some slight change in disbut by readily and rapidly dissolving in hot or cold water to provide a paste substantially identical in appearance, taste and aroma to the tomato paste from which the flakes were made.

It will also be seen that such flakes are produced by applying tension to the layer gathering at the doctor blade to reduce it to such flake thickness and by thereafter breaking, conveying and flaking the product in an atmosphere having a relative humidity substantially in equilibrium with the layer being processed. This is accomplished by so processing the flakes in an atmosphere supplied at a temperature of from about 48° to about 60° F. and at a relative humidity of from about 37% to about 42%.

The moisture content of the product and material in process, as set forth in the foregoing specification, was determined by use of a Cenco moisture tester which is based on a temperature time relationship in drying to a constant weight. The estimation of solids in tomato paste is extremely difficult because of the instability of the sugars and other components and to avoid breakdown of such sugars and other components the moisture tester was set at a low cycle which could result in a lower moisture content reading than that actually existing. This is borne out by comparative tests made on the product subsequent to the examples, using the Karl Fisher titration method of moisture measurement in which no heat is involved, a Karl reagent being employed which is an unstable reagent and must be freshly prepared. Using the Karl Fisher method showed the moisture content of the product to be from two to two and one quarter times that indicated by the Cenco tester. Accordingly the moisture content as referred to herein is based on such content as determined by drying to a constant weight and not by a titration method of testing, and the claims are to be so interpreted.

What is claimed is:

1. Apparatus for removing and cooling a continuous layer of tomato paste or the like from the surface of a drying drum revolving about a horizontal axis, comprising a doctor blade in contact with said drum surface, a traction cylinder mounted on the doctor blade side of said drum parallel with said doctor blade and having its periphery formed to provide a traction face adapted to engage frictionally the layer draped over said traction cylinder to provide tension in the section of said layer between said drying drum and traction cylinder, means for driving said traction cylinder at a suitable speed in relation to said drying drum to effect tension in said section of said layer between said drying drum and traction cylinder, and means directing a multiplicity of air jets upwardly against the underside of said section of said layer, both longitudinally and transversely thereof, to sustain said section while traveling under tension from said drying drum to said traction cylinder.

2. Apparatus as set forth in claim 1 wherein said multiplicity of air jets extend substantially the entire length and breadth of said section of said layer.

3. Apparatus as set forth in claim 2 wherein said section of said layer travels in an inclined path downwardly from said doctor blade to said traction cylinder, and wherein said multiplicity of jets are also in similarly inclined arrangement to provide a slide down which said section travels.

4. Apparatus for removing and cooling a continuous layer of tomato paste or the like from the surface of a drying drum revolving about a horizontal axis, comprising a doctor blade in contact with said drum surface, a traction cylinder mounted on the doctor blade side of said drum parallel with said doctor blade and having its periphery formed to provide a traction face adapted to engage frictionally the layer draped over said traction cylinder to provide tension in the section of said layer between said drying drum and traction cylinder, means for driving said traction cylinder at a suitable speed in relation to said drying drum to effect tension in said section of said layer between said drying drum and traction cylinder, and means directing a multiplicity of air jets upwardly against the underside of said section of said layer, both longitudinally and transversely thereof, to float and thereby sustain said section while traveling under tension from said drying drum to said traction cylinder, comprising a pan arranged below said section, a perforated cover on said pan, and means admitting air under pressure into said pan.

5. Apparatus as set forth in claim 4 wherein said means admitting air under pressure into said pan comprises a plurality of air pipes arranged in side-by-side relation in said pan and wherein each of said pipes has a longitudinal series of small holes extending transversely therethrough.

6. Apparatus for removing and cooling a continuous layer of tomato paste or the like from the surface of a drying drum revolving about a horizontal axis, comprising a doctor blade in contact with said drum surface, means directing cooling air against substantially the full length of the portion of layer being removed from the drum at the side of the layer opposite the doctor blade, a traction cylinder mounted on the doctor blade side of said drum parallel with and with its crest at a lower level than said doctor blade and having its periphery formed to provide a traction face adapted to engage frictionally the layer removed by said doctor blade and draped over said traction cylinder and provide tension in the section of said layer between said drying drum and traction cylinder travelling downwardly from said doctor blade to the crest of said traction cylinder, means driving said traction cylinder at a suitable speed in relation to said drying drum to effect tension in said downwardly moving section of said layer, an inclined plate between said cooling drum and traction cylinder and arranged to incline downwardly toward the crest of said traction cylinder in closely spaced relation under and substantially parallel with said downwardly moving section of said layer, and means introducing a stream of air between said plate and layer to cool said layer and also to floatingly support said layer in its downward passage from said doctor blade to said traction cylinder.

7. Apparatus for removing and cooling a continuous layer of tomato paste or the like from the surface of a drying drum revolving about a horizontal axis, comprising a doctor blade in contact with said drum surface, means directing cooling air against substantially the full length of the portion of layer being removed from the drum at the side of the layer opposite the doctor blade, a traction cylinder mounted on the doctor blade side of said drum parallel with and with its crest at a lower level than said doctor blade and having its periphery formed to provide a traction face adapted to engage frictionally the layer removed by said doctor blade and draped over said traction cylinder and provide tension in the section of said layer between said drying drum and traction cylinder travelling downwardly from said doctor blade to the crest of said traction cylinder, means driving said traction cylinder at a suitable speed in relation to said drying drum to effect tension in said downwardly moving section of said layer, an inclined plate between said cooling drum and traction cylinder and arranged to incline downwardly toward the crest of said traction cylinder in closely spaced relation under and substantially parallel with said downwardly moving section of said layer, means introducing a stream of air between said plate and layer to cool said layer and also to floatingly support said layer in its downward passage from said doctor blade to said traction cylinder, and a plurality of rotary breaker blades arranged in closely spaced relation to the traction cylinder and in the path of the layer dropping from between said traction cylinder and rolls and operating to break said dropping layer into pieces.

References Cited in the file of this patent

UNITED STATES PATENTS

| 879,060 | Paucksch | Feb. 11, 1908 |
| 1,501,514 | Boberg | July 15, 1924 |
| 2,201,747 | Staudt | May 21, 1940 |
| 2,316,176 | Lavett | Apr. 13, 1943 |
| 2,352,195 | Harcourt | June 27, 1944 |
| 2,352,220 | Overton | June 27, 1944 |
| 2,363,193 | Moore | Nov. 21, 1944 |
| 2,435,842 | Northcutt | Feb. 10, 1948 |
| 2,451,312 | Jones | Oct. 12, 1948 |
| 2,452,983 | Birdseye | Nov. 2, 1948 |
| 2,566,943 | King | Sept. 4, 1951 |
| 2,635,353 | Hahn | Apr. 21, 1953 |
| 2,886,101 | Overton | May 12, 1959 |